Aug. 9, 1949.  C. F. McCRACKEN  2,478,541
THERMOSTATICALLY OPERATED CIRCUIT CUTOUT
Filed Jan. 15, 1948

CLAUDE F. McCRACKEN,
INVENTOR.

BY Hazard & Miller

ATTORNEYS.

Patented Aug. 9, 1949

2,478,541

UNITED STATES PATENT OFFICE 2,478,541

THERMOSTATICALLY OPERATED CIRCUIT CUTOUT

Claude F. McCracken, Riverside, Calif.

Application January 15, 1948, Serial No. 2,358

4 Claims. (Cl. 177—7)

This invention relates to a circuit cut-out and in particular to a circuit cut-out for the horn circuit of an automobile or like vehicle.

Horns and in particular automobile horns stick occasionally or the horn circuit is shorted for one reason or other with the result that the horn is continuously energized and the ordinary driver is helpless to remedy the situation, resulting in considerable annoyance to the driver and the persons in the vicinity of the energized horn. Devices have been provided to automatically open or break the circuit when a horn sticks or when the horn circuit is shorted so that the horn is continuously energized but for one reason or other have not come to wide use. Some of the devices have been constructed so that they open or break the circuit of a stuck horn but are so constructed that within a very short time they again close the circuit and since there is usually considerable time necessary to repair a defective horn or horn circuit, this type of construction is objectional because it results in intermittent horn energizations.

A main object of this invention is to provide a cut-out for an automobile horn circuit or the like which cut-out is adapted to open or break the circuit after the horn switch has been depressed a predetermined length of time or when the horn circuit has been shorted so as to energize the horn a predetermined length of time.

Another object of this invention is to provide a cut-out for an automotive automobile circuit or the like which will deenergize the horn after the horn becomes stuck and to so construct the cut-out that it will not permit the horn to again become energized until the cut-out is manually reset.

Another object of this invention is to provide a cut-out for an automobile or circuit or the like which is adapted to open or break the circuit after the horn switch has been depressed a predetermined length of time and to so construct the cut-out that it is also deenergized at the same time so that no current from the battery is used while the circuit is broken.

Figure 1:
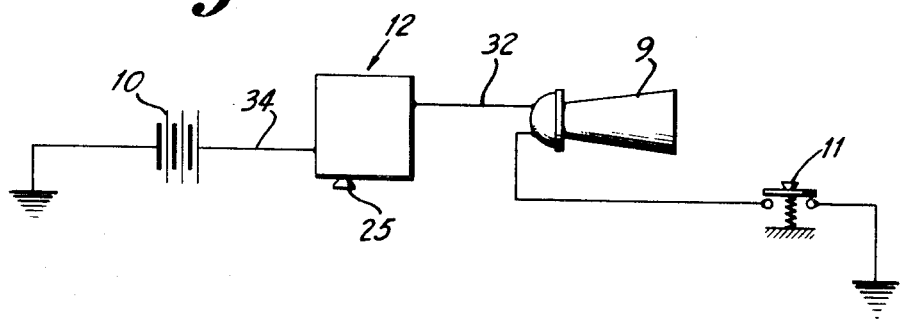
Figure 2:
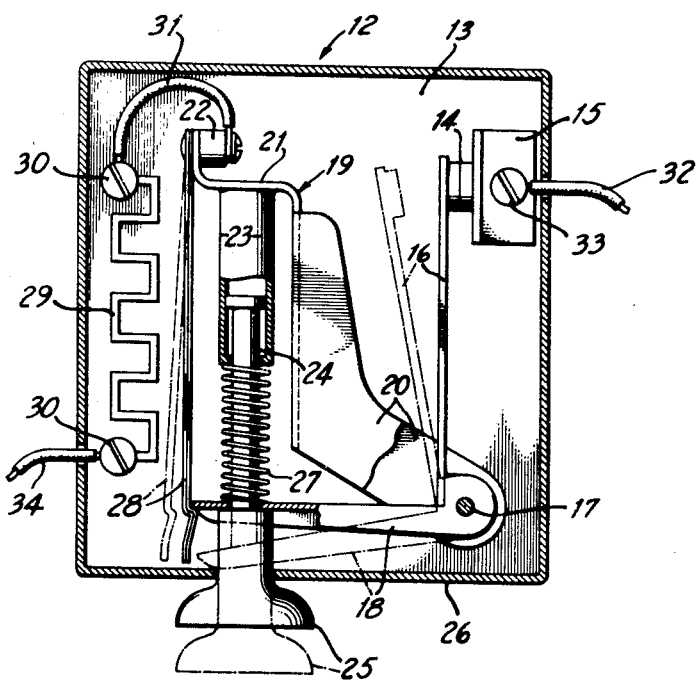

With the foregoing and other objects in view, which will be made manifest in the following detailed description and specifically pointed out in the appended claims, reference is had to the accompanying drawings for an illustrative embodiment of the invention, wherein:

Fig. 1 shows a schematic diagram of an automotive horn circuit with the cut-out of the present invention in the circuit; and Fig. 2 discloses a plan view of the cut-out of the present invention showing parts broken away.

Referring to the accompanying drawings wherein similar reference characters designate similar parts throughout, Fig. 1 shows a battery 10 with the negative side grounded connected in series with a circuit cut-out generally entitled 12 and the circuit cut-out is connected in series with a horn generally entitled 9 the horn being connected to an automotive horn button 11 of usual construction, said horn button being grounded.

The circuit cut-out 12 in the form of the invention disclosed comprises a base 13 of electrically non-conducting material having a circuit breaking switch 14 with one contact fixedly mounted on base 13 by means of an electrically conducting angle member 15 and its other contact movably mounted on one end of an electrically conducting bell crank 16, said bell crank being pivoted to base 13 at 17 and having the leg 18 thereof of outwardly facing channel shape, as shown in Fig. 2. An electrically conducting supporting member 19 having two spaced parallel angular flanges 20 and a reversely bent angular portion 21 is fixedly mounted on base 13 by means of pivot 17 and block 22, said block being formed of electrically conducting material. The flanges 20 of member 19 straddle the bell crank 16, as shown in Fig. 2, and a tubular member 23 is fixedly mounted on one side of part 21 of member 19 and provides a cylinder in which a plunger 24 rides. Plunger 24 is formed with an enlarged end, as shown in Fig. 2, and tube 23 has the end thereof opposite portion 21 inwardly bent or otherwise formed so as to prevent plunger 24 from moving completely out of tube 23. Plunger 24 passes through an aperture provided in the base of the channel of leg 18 of bell crank 16 and has a base portion 25 fastened thereto, said base portion passing through an aperture in a cover 26 which is provided to cover base 13 and the parts mounted on said base, said cover being formed preferably out of electrically non-conducting material. A compression spring 27 is positioned around plunger 24 and when in the position shown in Fig. 2 urges the plunger and leg 18 of bell crank 16 to move into the dot-dash position thereby causing the contacts of switch 14 to part and therefore open or break the circuit. A bi-metallic strip 28 is fixedly mounted at one of its ends to base 13 by means of block 22 and the other of its ends is formed with a bent portion so as to engage the end of leg 18 and prevent spring 27 from pivoting the bell crank 16. Base portion 25 is formed of electrically non-conducting material.

A heating resistor 29 is provided adjacent bi-metallic strip 28 and preferably fastened by means of screws 30 to base 13 and a lead 31 connects heating resistor 29 to block 22 so that current may pass through member 19, pivot 17, the upper arm of bell crank 16, through contacts 14 and out through a lead 32 which is connected to angle member 15 by means of a screw 33. A lead 34 leads from the heating resistor outward through an aperture provided in cover 26 to the horn circuit.

In operation the device functions as follows. When the horn button 11 is intermittently depressed, the heating resistor and bi-metallic strip are so constructed that the bi-metallic strip is not so effected as to move outward any material extent and therefore holds bell crank 16 in place and keeps switch 14 closed. However, when the automobile horn switch 11 is depressed to energize the horn a length of time such that the heating resistor 29 heats the bi-metallic strip 28 to that temperature which the bi-metallic strip moves outward to a position such as to unlatch bell crank 16, compression spring 27 moves plunger 24 outward, thereby pivoting bell crank 16 and parting the contacts of switch 14 therefore breaking or opening the circuit and deenergizing horn 9. It will be seen then that the bi-metallic strip can be so designed that it will not unlatch from the bell crank until it reaches a predetermined temperature or contains a predetermined amount of heat both of which are obtained by depressing the horn switch and energizing the horn a predetermined length of time. It will be noticed that under these conditions the horn will remain unenergized until the cut-out 12 is reset by manually depressing the plunger 24 by pressing on base 25 and pushing leg 18 upward so that it may once again be latched by the bi-metallic strip 28.

It will also be noted that when the circuit is broken after depression of horn 11 for too long a period of time that the heating resistor 29 is also deenergized and no current is being used from the battery and if desired this condition may be maintained until the automobile is taken to a garage and the defect repaired without any danger of running the battery down because no current is used by the horn circuit.

Although the heating resistor has been shown as being in series with the automobile horn, it is obvious that it may be connected in parallel with the horn and the device will function so as to deenergize the heating resistor and horn in case the horn becomes stuck.

Various changes may be made in the details of construction without departing from the spirit and scope of the invention as defined by the appended claims.

I claim:

1. A warning signal system comprising a battery having a positive side and a negative side, a heating element connected directly to the positive side of the battery, an electric signal device connected in series with the heating element, a manually operated switch in series with the heating element and the electric signal device having one contact thereof connected directly to ground and the other contact thereof connected directly to the electric signal device, a second switch in series with the heating element, the electric signal device and the manually operated switch and located between the electric signal device and the heating element and biased to open position, latching means holding said second switch closed responsive to a predetermined temperature generated by the heating element to unlatch said second switch, and means to relatch the second switch closed after the unlatching operation.

2. A warning signal system as set out in claim 1 in which the parts named are the only current drawing components of the circuit.

3. A warning signal system consisting of only a single series circuit comprising a battery having a positive side and a negative side, the negative side being grounded, a heating element connected directly to the positive side of the battery, an electric signal device connected in series with the heating element, a manually operated switch in series with the heating element and the electric signal device having one contact thereof connected directly to ground and the other contact thereof connected directly to the electric signal device, a second switch in series with the electric heating element, the electric signal device and the manually operated switch and located between the electric signal device and the heating element and biased to open position, latching means for holding the second named switch closed responsive to a predetermined temperature generated by continuous energization of the heating element to unlatch the second named switch, and means operable on the latching means to relatch the second named switch to closed position after the second named switch is unlatched.

4. A warning signal system consisting of only a single series circuit, the single series circuit comprising a battery, a heating element, an electric signal device, a manually operated switch and a second switch all in series with one another, the manually operated switch having one contact thereof connected directly to ground and the other contact thereof connected directly to the electric signal device, said second switch being biased to open position and latching means for holding said second switch closed responsive to a predetermined temperature generated by continuous energization of the heating element for unlatching said second switch, the latching means being arranged to be reset after its unlatching operation to close the second named switch.

C. F. McCRACKEN.

REFERENCES CITED

The following references are of record in the file of this patent:

UNITED STATES PATENTS

| Number | Name | Date |
|---|---|---|
| 276,286 | Rhodes | Apr. 24, 1883 |
| 1,442,313 | Watson | Jan. 16, 1923 |
| 1,826,477 | Olpp | Oct. 6, 1931 |
| 1,889,488 | O'Brian | Nov. 29, 1932 |
| 2,375,881 | Zeller | May 15, 1945 |

FOREIGN PATENTS

| Number | Country | Date |
|---|---|---|
| 632,075 | France | Sept. 27, 1927 |